(12) United States Patent  (10) Patent No.: US 9,116,275 B2
Kamada  (45) Date of Patent: Aug. 25, 2015

(54) ILLUMINATION DEVICE, DISPLAY DEVICE, AND TELEVISION RECEIVING DEVICE

(71) Applicant: Sharp Kabushiki Kaisha, Osaka (JP)

(72) Inventor: Kentaro Kamada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 18 days.

(21) Appl. No.: 14/348,737

(22) PCT Filed: Sep. 28, 2012

(86) PCT No.: PCT/JP2012/075073
§ 371 (c)(1),
(2) Date: Mar. 31, 2014

(87) PCT Pub. No.: WO2013/051474
PCT Pub. Date: Apr. 11, 2013

(65) Prior Publication Data
US 2014/0320747 A1  Oct. 30, 2014

(30) Foreign Application Priority Data
Oct. 6, 2011 (JP) .................. 2011-222202

(51) Int. Cl.
G02B 6/10 (2006.01)
F21V 8/00 (2006.01)
(52) U.S. Cl.
CPC ............ *G02B 6/0088* (2013.01); *G02B 6/0013* (2013.01); *G02B 6/0085* (2013.01); *G02B 6/0055* (2013.01)
(58) Field of Classification Search
CPC .. G02B 6/0013; G02B 6/0023; G02B 6/0085; G02B 6/0088

USPC ....................... 362/612, 621; 349/65
See application file for complete search history.

(56) References Cited

U.S. PATENT DOCUMENTS 5,211,464 A * 5/1993 Bohmer ................. 362/634
5,688,035 A 11/1997 Kashima et al.
(Continued)

FOREIGN PATENT DOCUMENTS

JP 8-146232 A 6/1996
JP 8-327828 A 12/1996
(Continued)

OTHER PUBLICATIONS

U.S. Appl. No. 14/348,446, filed Mar. 28, 2014.

*Primary Examiner* — Peggy Neils
(74) *Attorney, Agent, or Firm* — Chen Yoshimura LLP

(57) ABSTRACT

The backlight device (24) is provided with a bottom plate (22a), a light-guide plate (20) that has a light-receiving face (20a) on a side face and that is arranged such that the back surface of the plate is oriented to face the front of the bottom plate (22a), an LED light-source (28) that is arranged opposite to the light-receiving face (20a) on the front surface of the bottom plate (22a), a reflective sheet (26) that is arranged to be in contact with the bottom surface of the light guide plate (20), a protruding member (38) that is formed so as to protrude from the front surface of the bottom plate (22a) and that has, as top surfaces, a first surface (38a) provided so as to contact the surface of the reflective sheet (26) on the side opposite of the bottom plate and a second surface (38b) that is separated from the first surface (38a) by a step (38c) and that, between the light-receiving face (20a) and the LED light source (28), is higher than the back surface of the light guide plate (20).

13 Claims, 8 Drawing Sheets

(56) References Cited

U.S. PATENT DOCUMENTS

| | | | |
|---|---|---|---|
| 5,788,356 A | 8/1998 | Watai et al. | |
| 7,226,199 B2 * | 6/2007 | Shimizu et al. | 362/609 |
| 8,159,629 B2 * | 4/2012 | Yamashita et al. | 349/58 |
| 2005/0259442 A1 | 11/2005 | Sakurai | |
| 2008/0180600 A1 | 7/2008 | Oh | |
| 2011/0085107 A1 * | 4/2011 | Noh et al. | 349/61 |
| 2013/0094245 A1 | 4/2013 | Kanda et al. | |

FOREIGN PATENT DOCUMENTS

| | | |
|---|---|---|
| JP | 2004-327082 A | 11/2004 |
| JP | 2005-283825 A | 10/2005 |
| JP | 2005-338155 A | 12/2005 |
| JP | 2008-192605 A | 8/2008 |
| JP | 2008-257954 A | 10/2008 |
| JP | 4777469 B1 | 9/2011 |
| WO | 2013/051473 A1 | 4/2013 |

* cited by examiner

ILLUMINATION DEVICE, DISPLAY DEVICE, AND TELEVISION RECEIVING DEVICE

TECHNICAL FIELD

The present invention relates to an illumination device, a display device, and a television receiver.

BACKGROUND ART

In recent years, flat panel display devices that use flat panel display elements such as liquid crystal panels and plasma display panels are increasingly used as display elements for image display devices such as television receivers instead of conventional cathode-ray tube displays, allowing image display devices to be made thinner. Liquid crystal panels used in liquid crystal display devices do not emit light on their own, and therefore, it is necessary to provide a separate backlight device as an illumination device. A known example of such a backlight device is an edge-lit type backlight device in which a light-receiving face is provided on a side face of a light guide plate, and a light source such as an LED is provided facing the side face of the light guide plate.

In the edge-lit type backlight device, a light guide plate is housed in a chassis, which is provided as a case. In some cases, a reflective sheet that reflects light leaked from the light guide plate back to the light guide plate is disposed on a surface of the light guide plate that faces a bottom of the chassis. By having such a reflective sheet, the light leaking from the light guide plate and reflected by the reflective sheet is directed toward the display surface, and as a result, uneven brightness and the like on the display surface of the backlight device can be improved. Patent Document 1 discloses such a backlight device, for example.

RELATED ART DOCUMENT

Patent Document

Patent Document 1: Japanese Patent Application Laid-Open Publication No. 2005-338155

Problems to be Solved by the Invention

In some of the backlight devices having such a reflective sheet, another member such as a buffer member is provided between the reflective sheet and the bottom plate of the chassis or the like in order to prevent or suppress the effect of warping in an edge portion of the light-receiving surface of the light guide plate, warping in the reflective sheet, and the like. When such an additional member is provided, an edge portion of the reflective sheet adjacent to the light source is separated from the bottom plate of the chassis or the like, and the edge portion of the reflective sheet adjacent to the light source is not supported. This causes a risk that the edge portion of the reflective sheet adjacent to the light source is separated from a surface of the light guide plate facing the bottom plate of the chassis. If the edge portion of the reflective sheet adjacent to the light source is separated from the surface of the light guide plate, in some cases, light from the light source directly reaches the edge portion of the reflective sheet adjacent to the light source, is reflected by the reflective sheet toward the display surface, and is displayed on the display surface as a light leakage after passing through the light guide plate.

SUMMARY OF THE INVENTION

The technology disclosed in the present specification was made in view of the above-mentioned problems. The technology disclosed in the present specification is aiming at providing an illumination device that can prevent or mitigate a light leak on a display surface.

Means for Solving the Problems

The technology disclosed in the present specification relates to an illumination device that includes: a plate member; a light guide plate having a side face acting as a light-receiving face, the light guide plate being disposed such that a surface thereof faces a surface of the plate member; a light source disposed above the surface of the plate member so as to face the light-receiving face; a reflective sheet disposed on the surface of the light guide plate; and a protruding member protruding from the surface of the plate member, the protruding member having a first surface and a second surface as two top surfaces, the first surface being disposed so as to contact a surface of the reflective sheet that faces the plate member, the second surface being disposed at a level higher than the first surface and the surface of the light guide plate and between the light-receiving face and the light source.

With the above-mentioned illumination device, the edge portion of the reflective sheet adjacent to the light source makes contact with the first surface, thereby being supported by the first surface. Therefore, it is possible to prevent the edge portion from being separated from the light guide plate. As a result, even if light reaches the edge portion of the reflective sheet adjacent to the light source, the light is less likely to enter a space between the light guide plate and the reflective sheet. Furthermore, light travelling from the light source toward the edge portion of the reflective sheet adjacent to the light source is blocked by the second surface. Thus, it is possible to make the light from the light source less likely to reach the edge portion of the reflective sheet adjacent to the light source. With such a configuration, it is possible to prevent or mitigate a light leak on the display surface caused by light entering a space between the light guide plate and the edge portion of the reflective sheet.

The reflective sheet may have a first folded section in an edge portion that is adjacent to the light source, the first folded section being folded along the level difference.

With this configuration, light travelling from the light source toward a space between the level difference in the protruding member and the light-receiving face of the light guide plate is reflected by the first folded section and then enters the light-receiving face. Therefore, it is possible to improve the light incident efficiency of the light from the light source at the light-receiving face.

The reflective sheet may have a second folded section that is folded toward the light source from an edge of the first folded section along the second surface.

With this configuration, light travelling from the light source toward the second surface of the protruding member is reflected by the second folded section and then enters the light-receiving face. Therefore, it is possible to further improve the light incident efficiency of the light from the light source at the light-receiving face.

A face that constitutes the level difference may be in contact with the light-receiving face.

With this configuration, it is possible to prevent, by the face that creates the level difference, the light-receiving face of the light guide plate from moving toward the light source due to the thermal expansion or the like, and therefore, the distance between the light source and the light-receiving face can be maintained constant. As a result, excellent optical properties can be achieved.

The second surface of the protruding member may be formed to be lower than an edge of the light source that faces the plate member in a cross-sectional view.

With this configuration, light emitted from the light source and travelling toward the light-receiving face is less likely to be blocked by the protruding member, and therefore, it is possible to prevent or mitigate the reduction in light incident efficiency at the light-receiving face due to the protruding member.

The protruding member may be integrally formed with the plate member.

With this configuration, the protruding member and the plate member can be manufactured at the same time in the manufacturing process, and therefore, it is possible to form the protruding member with ease.

The illumination device may further include a buffer member disposed between the reflective sheet and the plate member, and the buffer member may be made of PORON.

With this configuration, the warping of the reflective sheet can be absorbed by the buffer member, and excellent optical design can therefore be achieved.

The plate member may have a wall portion that rises on the surface above which the light source is disposed, the illumination member may further includes a light source substrate having the light source disposed on one surface, the light source substrate may be attached to the wall portion, and the plate member may have a higher heat-dissipating property than a heat-dissipating property of the light source substrate.

With this configuration, heat in the light source substrate can be effectively dissipated by the plate member, and therefore, the illumination device having excellent heat-dissipating property can be achieved.

The illumination device may further include a chassis that houses the light guide plate, the light source, and the reflective sheet, and the plate member may be a part of the chassis.

With this configuration, a specific configuration in which the protruding member is disposed on a part of the chassis can be achieved.

The illumination device may further include a heat-dissipating member having the plate member as a part thereof and having a heat-dissipating property, and a chassis that houses the light guide plate, the light source, the reflective sheet, and the heat-dissipating member.

With this configuration, a specific configuration in which the protruding member is disposed on a part of the heat-dissipating member can be achieved.

The techniques disclosed in the present specification can be expressed as a display device that includes a display panel that displays images using light from the above-mentioned illumination device. Also, a display device that uses a liquid crystal panel that uses liquid crystal as the display panel is novel and useful. A television receiver that includes the above-mentioned display device is also novel and useful.

Effects of the Invention

According to the technology disclosed in the present specification, an illumination device that can prevent or mitigate a light leak on a display surface can be provided.

DETAILED DESCRIPTION OF EMBODIMENTS

<Embodiment 1>

Embodiment 1 will be described with reference to the drawings. Each of the drawings indicates an X axis, a Y axis, and a Z axis in a portion of the drawings, and each of the axes indicates the same direction for the respective drawings. The Y axis direction corresponds to the vertical direction and the X axis direction corresponds to the horizontal direction. Unless otherwise noted, "up" and "down" in the description is based on the vertical direction.

Figure 1:
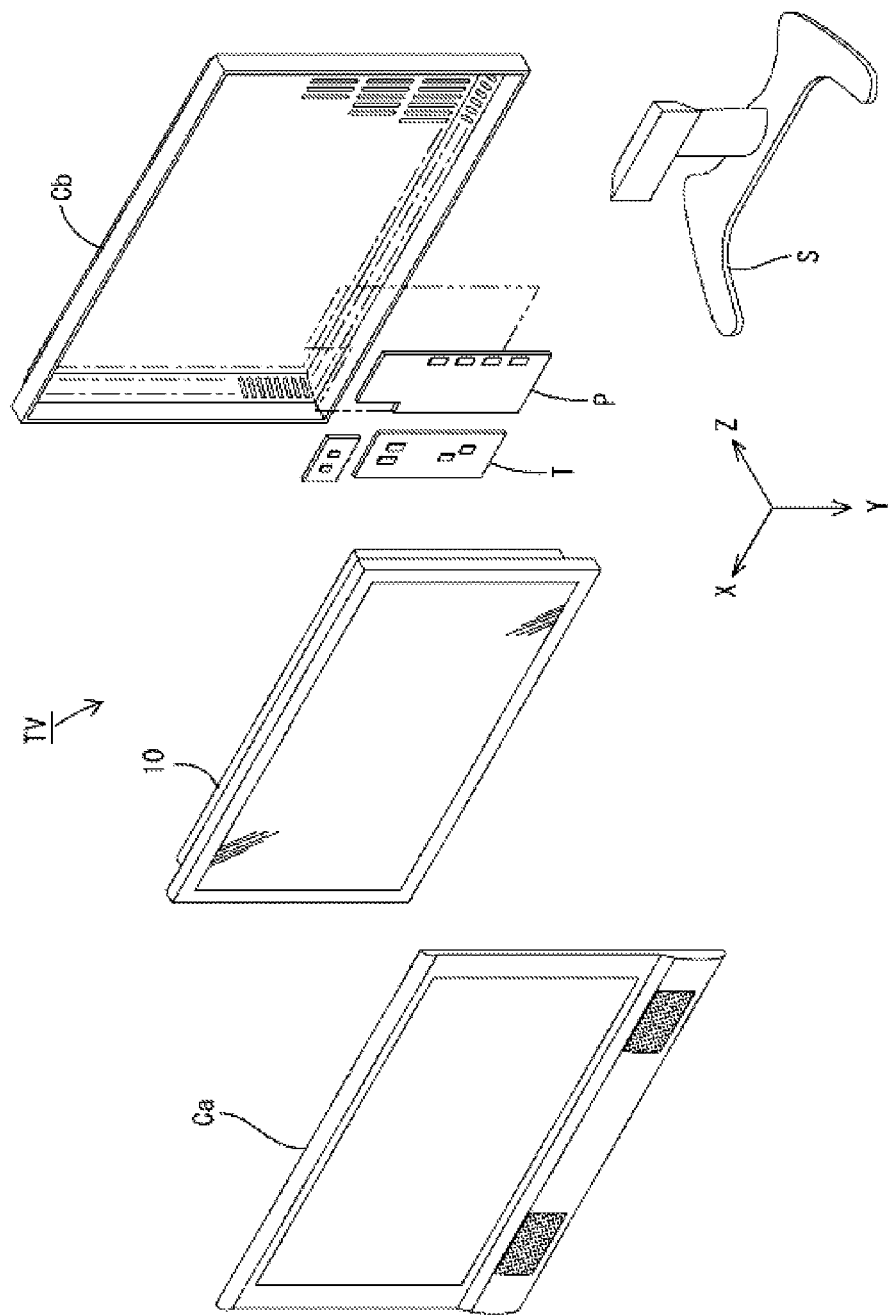
FIG. 1 is an exploded perspective view of a television receiver TV according to Embodiment 1.

FIG. 1 is an exploded perspective view of a television receiver TV according to Embodiment 1. The television receiver TV includes a liquid crystal display device 10, front and rear cabinets Ca and Cb that house the display device D therebetween, a power source P, a tuner T, and a stand S.

Figure 2:
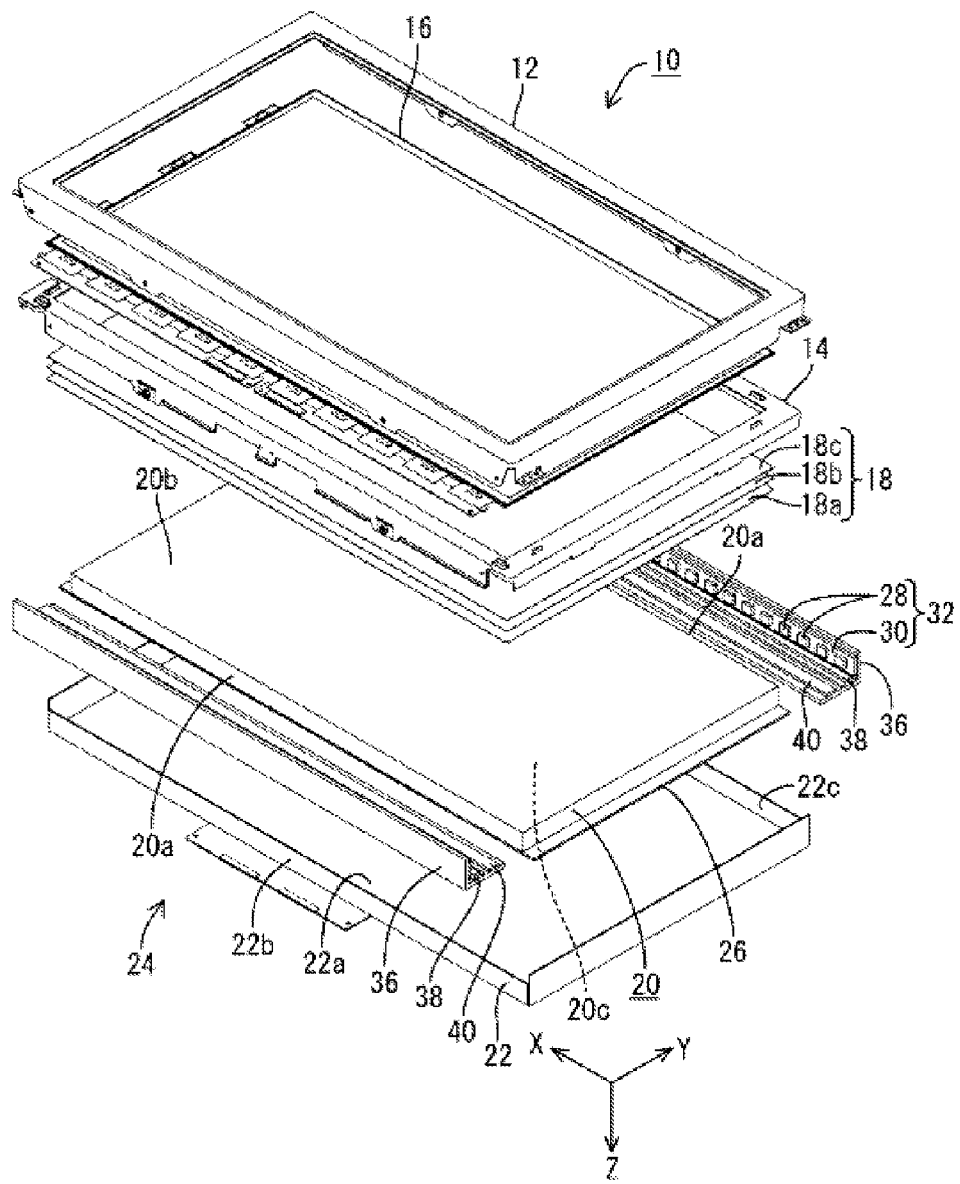
FIG. 2 is an exploded perspective view of a liquid crystal display device 10.

FIG. 2 is an exploded perspective view of the liquid crystal display device 10. The upper side of FIG. 2 is the front side, and the lower side is the rear side. As shown in FIG. 2, the liquid crystal display device 10 is formed in a horizontally-long quadrangle as a whole, includes a liquid crystal panel 16, which is a display panel, and a backlight device 24, which is an external light source, and is held together as one component by a frame-shaped bezel 12 and the like.

Next, the liquid crystal pane 16 will be described. In the liquid crystal panel 16, a pair of transparent (having a high light transmission) glass substrates is bonded together with a prescribed gap therebetween, and a liquid crystal layer (not shown) is sealed between the glass substrates. In one of the glass substrates, switching elements (TFTs, for example) connected to source wiring lines and gate wiring lines intersecting with each other, pixel electrodes connected to the switching elements, an alignment film, and the like are provided. In the other of the glass substrates, color filters having respective colored portions such as R (red), G (green), B (blue), and the like arranged in a prescribed pattern, an opposite electrode, an alignment film, and the like are provided. Of these, the source wiring lines, the gate wiring lines, the opposite electrode, and the like are supplied with image data and various control signals necessary in order to display images from a driver circuit substrate that is not shown in drawings. Polarizing plates (not shown) are disposed on the outer sides of the respective glass substrates.

Figure 3:
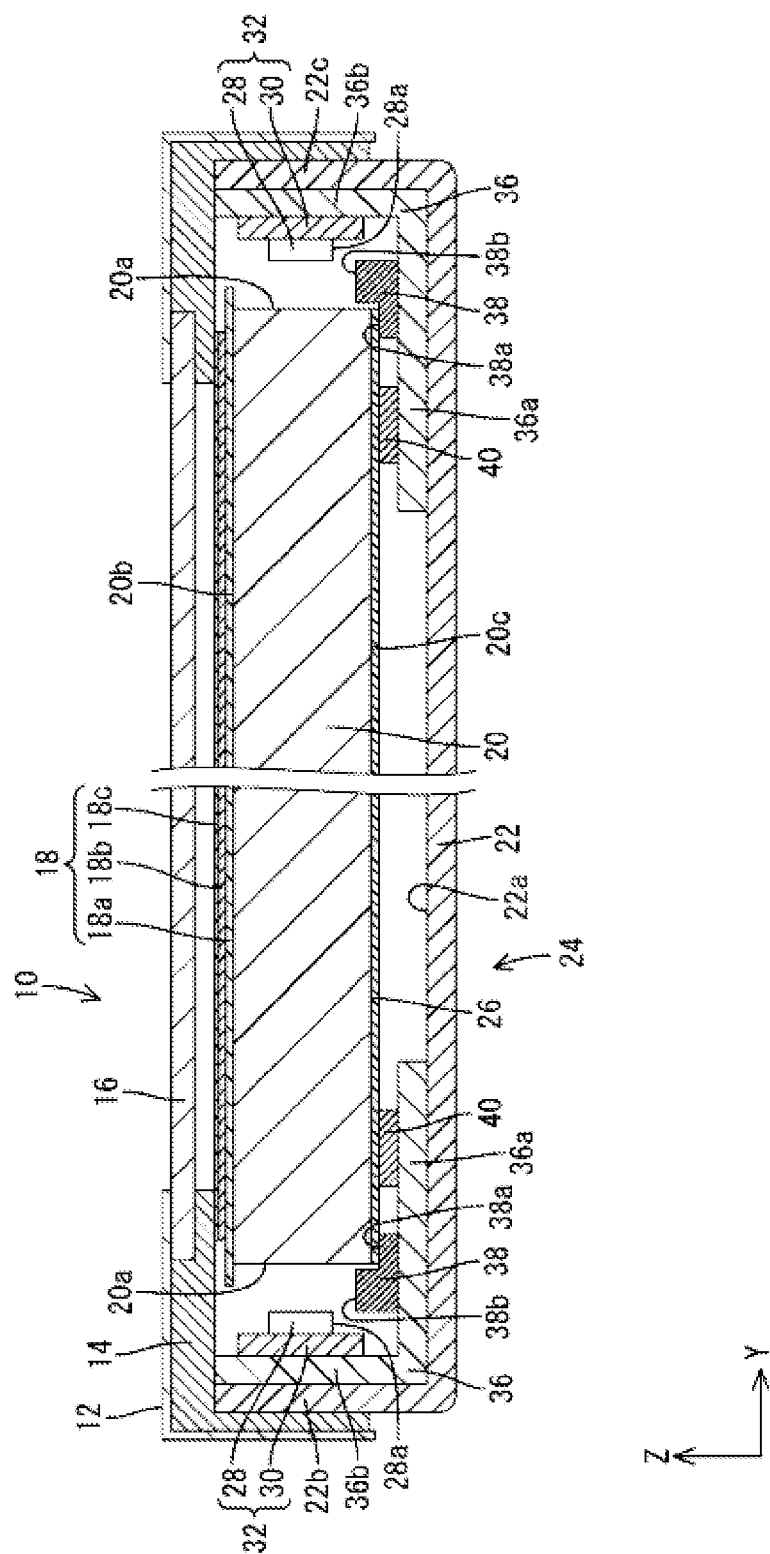
FIG. 3 is a cross-sectional view of the liquid crystal display device 10.

Next, the backlight device 24 will be described. FIG. 3 is a cross-sectional view that shows a cross-section of the liquid crystal display device 10 along the vertical direction (Y axis direction). As shown in FIGS. 2 and 3, the backlight device 24 includes a frame 14, optical members 18, and a chassis 22. The frame 14 has a frame shape and is arranged along edges of a front surface (light-exiting surface 20b) of a light guide plate 20. The frame 14 supports the liquid crystal panel 16 along the inner edges. The optical members 18 are placed on the front side (the light-exiting surface 20b side) of the light guide plate 20. The chassis 22 has a substantially box shape that is open on the front side (light-exiting side/liquid crystal panel 16 side).

A pair of heat-dissipating members 36 and 36, a pair of LED (light-emitting diode) units 32 and 32, a reflective sheet 26, a light guide plate 20, a protruding member 38, and a buffer member 40 are housed inside the chassis 22. Each of the pair of the heat-dissipating members 36 and 36 extends along the longer side direction of the chassis 22, and the cross-section thereof is formed in a substantially L-shape. A part of each heat-dissipating member 36 makes contact with one of two longer side plates 22b and 22c of the chassis 22. The pair of LED units 32 and 32 extends along the longer side direction of the chassis 22, respectively, and is disposed so as to make contact with the inner sides of the respective heat-dissipating members 36 on the longer sides of the chassis 22. The pair of LED units emits light toward light-receiving faces 20a of the light guide plate 20. The longer side faces (light-receiving faces) 20a of the light guide plate 20 are disposed to face the respective LED units 32 and 32 and guide light emitted from the LED units 32 toward the liquid crystal panel 16. The optical members 18 are placed on the front side of the light guide plate 20. In the backlight device 24 of the present embodiment, the light guide plate 20 and the optical members 18 are disposed directly below the liquid crystal panel 16, and the LED units 32, which are the light sources, are disposed on side edges of the light guide plate 20, this configuration being the so-called edge-lit type (side light type).

The chassis 22 is made of a metal such as an aluminum-type material, for example, and is constituted of a bottom plate 22a that is rectangular in a plan view, side walls 22b and 22c that rise from the outer edges of the respective long sides of the bottom plate 22a, and side walls that rise from the outer edges of the respective short sides of the bottom plate 22a. The space inside the chassis 22 between the LED units 32 and 32 is the housing space for the light guide plate 20. On the rear side of the bottom plate 22a, a power source circuit board (not shown) that supplies power to the LED units 32, and the like are attached.

The optical members 18 include a diffusion sheet 18a, a lens sheet 18b, and a reflective polarizing plate 18c stacked in this order from the light guide plate 20 side. The diffusion sheet 18a, the lens sheet 18b, and the reflective polarizing plate 18c function to convert the light emitted from the LED units 32 and transmitted through the light guide plate 20 into planar light. The liquid crystal panel 16 is disposed on the upper side of the reflective polarizing plate 18c, and the optical members 18 are disposed between the light guide plate 20 and the liquid crystal panel 16.

The LED unit 32 has a configuration in which the LED light sources 28, which emit white light, are aligned in a row on a rectangular LED substrate 30, which is made of a resin. The face of the LED substrate 30 that is opposite to the face on which the LED light sources 28 are arranged abuts a heat-dissipating member 36. The LED light source 28 may have a configuration in which white light is emitted by having a blue light emitting element coated with a fluorescent material that has a light emitting peak in the yellow region. The LED light source 28 may alternatively have a configuration in which white light is emitted by having a blue light emitting element coated with fluorescent materials that have light emitting peaks in the green region and the red region, respectively. The LED light source 28 may also have a configuration in which white light is emitted by having a blue light emitting element coated with a fluorescent material that has a light emitting peak in the green region, and combining this with a red light emitting element. The LED light source 28 may also have a configuration in which white light is emitted by combining a blue light emitting element, a green light emitting element, and a red light emitting element. The LED light source 28 may also be a combination of an ultraviolet light emitting element with fluorescent materials. In particular, the LED light source 28 may have a configuration in which white light is emitted by having the ultraviolet light emitting element coated with fluorescent materials that have light emitting peaks in the blue, green, and red regions, respectively.

The light guide plate 20 is a rectangular plate-shaped member formed of a resin of acrylic or the like with a high light transmission (high transparency), and is in contact with the reflective sheet 26 and supported by the chassis 22. As shown in FIGS. 2 and 3, between the pair of LED units 32 and 32, the light guide plate 20 is disposed such that the light-exiting surface 20b, which is the main plate surface thereof, faces the diffusion sheet 18a, and such that an opposite plate surface 20c, which is the plate surface opposite to the light-exiting surface 20b, faces the reflective sheet 26. By providing such a light guide plate 20, the light generated by the LED units 32 enters from the light-receiving faces 20a of the light guide plate 20 and exits from the light-exiting surface 20b that faces the diffusion sheet 18a, thereby illuminating the liquid crystal panel 16 from the rear side thereof.

The reflective sheet 26 is in a rectangular shape and made of a synthetic resin, and the surface thereof is white with excellent light-reflecting characteristics. The reflective sheet 26 is placed on the front side of the bottom plate 22a of the chassis 22. The reflective sheet 26 has a reflective surface on the front side thereof, and this reflective surface abuts the opposite plate surface 20c of the light guide plate 20. The reflective sheet 26 can reflect light that has leaked from the LED units 32 or light guide plate 20 toward the light reflective surface of the reflective sheet 26.

The heat-dissipating members 36 and 36, which form a pair, are plate-shaped members having an L-shaped cross section and having higher heat-dissipating properties than the LED substrate 30. Each heat-dissipating member 36 is disposed along the longer side direction of the chassis 22, and is constituted of a bottom section 36a and a wall section 36b (see FIG. 4). The bottom section 36a is formed in a rectangular shape in a plan view (see FIG. 2), and extends from the side plate 22b of the chassis 22 toward an edge portion of the light guide plate 20 along the bottom plate 22a of the chassis 22. The bottom section 36a makes contact with the bottom plate 22a of the chassis 22. One edge of the bottom section 36a abuts the side plate 22b of the chassis 22. The wall section 36b rises from the edge of the bottom section 36a that abuts the side plate 22b of the chassis 22 perpendicularly to the bottom plate 22a of the chassis 22 so as to be formed in a plate shape. One surface (outer surface) of the wall section 36b makes contact with the side plate 22b of the chassis 22, and the other surface (inner surface) thereof makes contact with a surface of the LED substrate 30 opposite to the side where the LED light sources 28 are disposed.

The buffer member 40 is made of PORON, and is disposed in an edge portion of the light guide plate 20 so as to be interposed between the reflective sheet 26 and the bottom plate 22a of the chassis 22. Therefore, the reflective sheet 26 is separated from the bottom plate 22a of the chassis 22. By providing the buffer members 40 as described above, even if the light guide plate 20 or the reflective sheet 26 has warping, the warping is absorbed by the buffer members 40, and therefore, the heights of the light-emitting surfaces of the respective LED light sources 28 can be made consistent with respect to the height of the light-receiving faces 20a of the light guide plate 20 that face the light-emitting surfaces along the longer side direction of the chassis 22. As a result, excellent optical design can be achieved for the backlight device 24.

Figure 4:
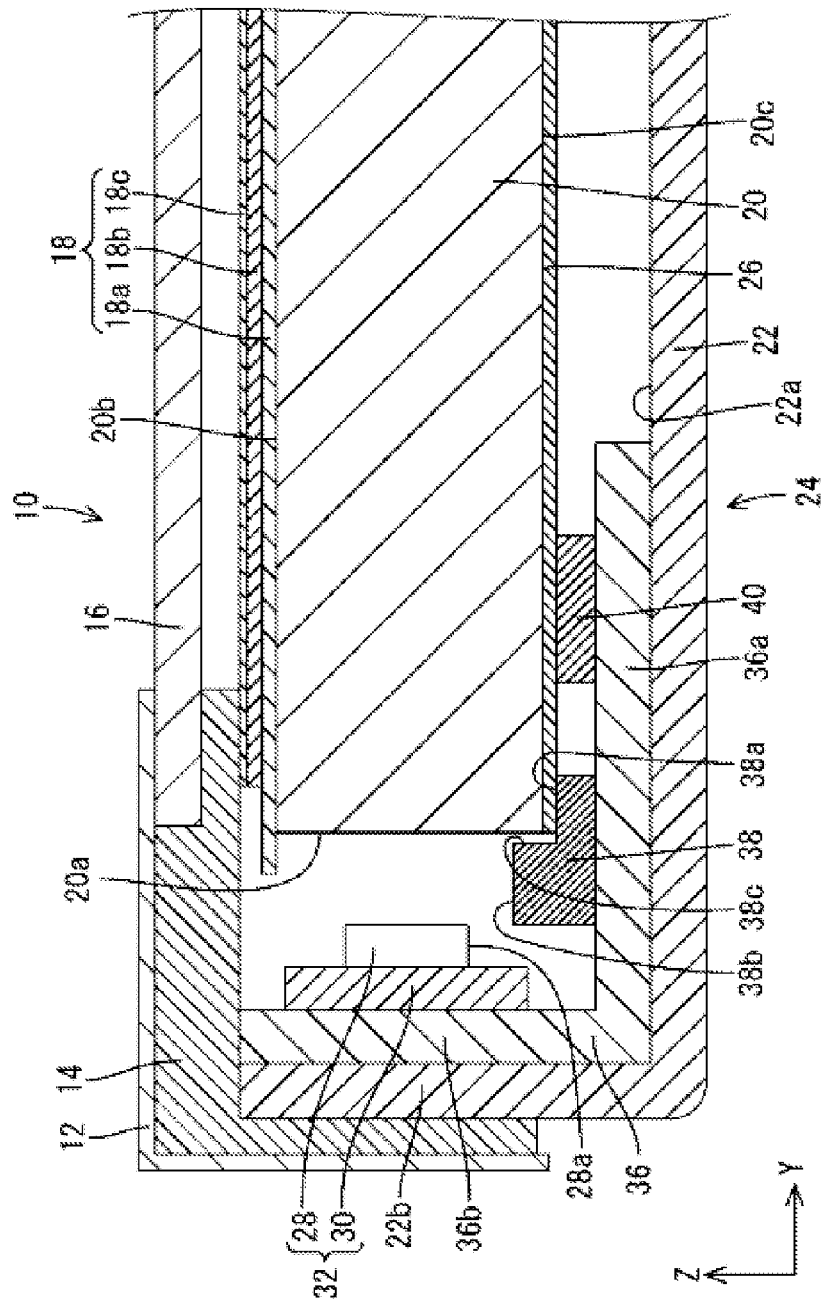
FIG. 4 is a cross-sectional view of a main part of the liquid crystal display device 10.

Next, the configuration of the protruding member 38, which is the main part of the present embodiment, will be explained. FIG. 4 is a cross-sectional view of the main part of the liquid crystal display device 10, showing an enlarged cross-sectional view of a portion near the protruding member 38 of FIG. 3. As shown in FIG. 4, the protruding member 38 is disposed along the longer side of the chassis 22 so as to protrude from the surface of the bottom section 36a of the heat-dissipating member 36 toward the front side of the backlight device 24 and so as to be perpendicular to the bottom section 36a. The protruding member 38 has two top surfaces, which are a first surface 38a and a second surface 38b disposed at different levels. Both of the first surface 38a and the second surface 38b of the protruding member 38 are arranged so as to be parallel to the bottom section 36a. A face 38c that creates the level difference between the first surface 38a and the second surface 38b (will be referred to as a third face 38c below) is located at a position that is very close to an edge portion of the reflective sheet 26 adjacent to the LED light source 28, and the edge portion of the reflective sheet 26 adjacent to the LED light source 28 is covered by the third face 38c.

The first surface 38a of the protruding member 38 is located between the reflective sheet 26 and the bottom section 36a, and in contact with a surface of the reflective sheet 26 that faces the bottom section 36a in the edge portion of the reflective sheet 26 adjacent to the LED light source 28. Therefore, the edge portion of the reflective sheet 26 adjacent to the LED light source 28 is supported by the first surface 38a of the projecting member 38. The second surface 38b of the protruding member 38 is located between the LED light source 28 and the light-receiving face 20a of the light guide plate 20 and at a height greater than the height of the opposite surface 20c of the light guide plate 20 (closer to the front side of the backlight device 24 than the opposite surface 20c). The second surface 38b is also located at a height that is lower than the height of a bottom edge 28a of a light-emitting surface of the LED light source 28 (closer to the rear side of the backlight device 24 than the bottom edge 28a of the light-emitting surface). Therefore, light emitted from the LED light sources 28 and travelling toward the edge portion of the reflective sheet 26 adjacent to the LED light sources 28 is blocked by the second surface 38b.

As described above, in the backlight device 24 of the present embodiment, the edge portion of the reflective sheet 26 adjacent to the LED light sources 28 is in contact with the first surface 38a of the protruding member 38, thereby being supported by the first surface 38a. Therefore, it is possible to prevent the edge portion of the reflective sheet 26 from being separated from the light guide plate 20. Thus, even if light reaches the edge portion of the reflective sheet 26 adjacent to the LED light sources 28, the light is less likely to enter a space between the light guide plate 20 and the reflective sheet 26. Furthermore, light travelling from the LED light sources 28 toward the edge portion of the reflective sheet 26 adjacent to the LED light sources 28 is blocked by the second surface 38b of the protruding member 38. As a result, the light from the LED light sources 28 is less likely to reach the edge portion of the reflective sheet 26 adjacent to the LED light sources 28. As described above, light is prevented from entering a space between the light guide plate 20 and the edge portion of the reflective sheet 26 by the first surface 38a and the second surface 38b of the protruding member 38, and therefore, it is possible to prevent or mitigate a light leak on the display surface of the liquid crystal panel 16 caused by light entering a space between the light guide plate 20 and the edge portion of the reflective sheet 26.

In the backlight device 24 of the present embodiment, the height of the second surface 38b of the protruding member 38 does not exceed the height of an edge of the LED light source 28 that faces the bottom section 36a in a cross-sectional view. With this configuration, light emitted from the LED light sources 28 and travelling toward the light-receiving faces 20a is less likely to be blocked by the protruding members 38, and therefore, it is possible to prevent or mitigate the reduction in light incident efficiency at the light-receiving faces 20a due to the protruding members 38.

The backlight device 24 of the present embodiment further includes buffer members 40 interposed between the reflective sheet 26 and the bottom section 36a. The buffer members 40 are made of PORON. This makes it possible to absorb the warping of the reflective sheet 26 by the buffer members 40, and excellent optical design can therefore be achieved.

In the backlight device 24 of the present embodiment, the heat-dissipating member 36 further has a wall section 36b that rises from the bottom section 36a toward the front side (the side where the LED light sources 28 are disposed), and the LED substrate 30 that has the LED light sources 28 disposed on one surface thereof. The LED substrate 30 is attached to the wall section 36b, and the bottom section 36a has a higher heat-dissipating property than the LED substrate 30. With this configuration, because heat in the LED substrate 30 can be effectively dissipated by the bottom section 36a, the backlight device 24 with excellent heat-dissipating property can be achieved.

<Embodiment 2>

Figure 5:
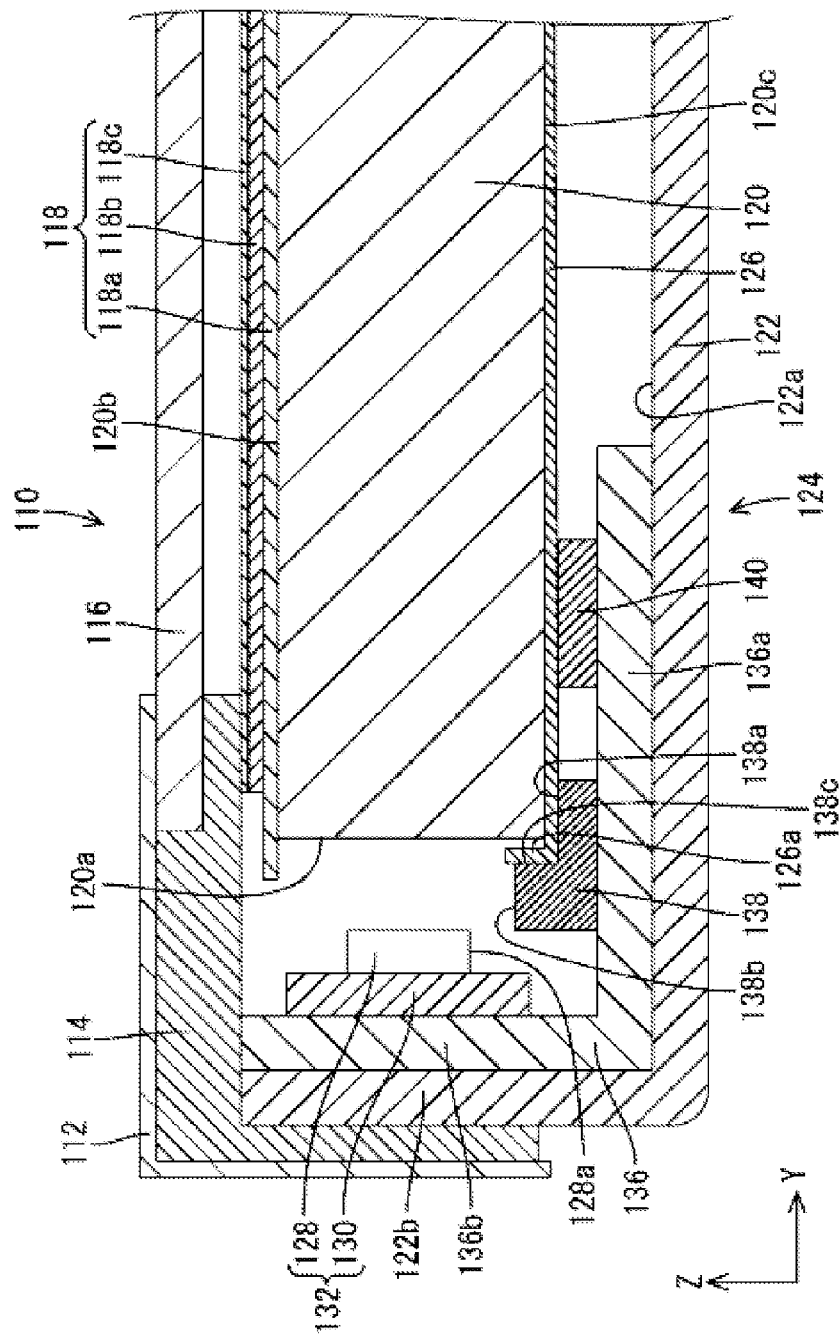
FIG. 5 is a cross-sectional view of a main part of a liquid crystal display device 110 according to Embodiment 2.

Embodiment 2 will be described with reference to the drawings. FIG. 5 shows a cross-sectional view of a main part of a liquid crystal display device 110 according to Embodiment 2. Embodiment 2 differs from Embodiment 1 in the configuration of an edge portion of a reflective sheet 126 adjacent to LED light sources 128. Other configurations are similar to those of Embodiment 1, and therefore, descriptions of the configurations, the operation, and the effect will be omitted. Parts in FIG. 5 that have 100 added to the reference characters of FIG. 4 are the same as these parts described in Embodiment 1.

As shown in FIG. 5, in the backlight device 124 of Embodiment 2, an edge portion of the respective sheet 126 adjacent to the LED light sources 128 extends toward the LED light sources 128 beyond a light-receiving face 120a of a light guide plate 120. The portion of the reflective sheet 126 extending toward the LED light sources 128 is folded along the level difference of a protruding member 138, thereby forming a first folded portion 126a. By the reflective sheet 126 having such a configuration, light travelling from the LED light sources 128 toward a space between the step in the protruding member 138 and the light-receiving face 120a of the light guide plate 120 is reflected by the first folded portion 126a and then enters the light-receiving face 120a. This makes it possible to improve the light incident efficiency of the light from the LED light sources 128 at the light-receiving face 120a.

<Embodiment 3>

Figure 6:
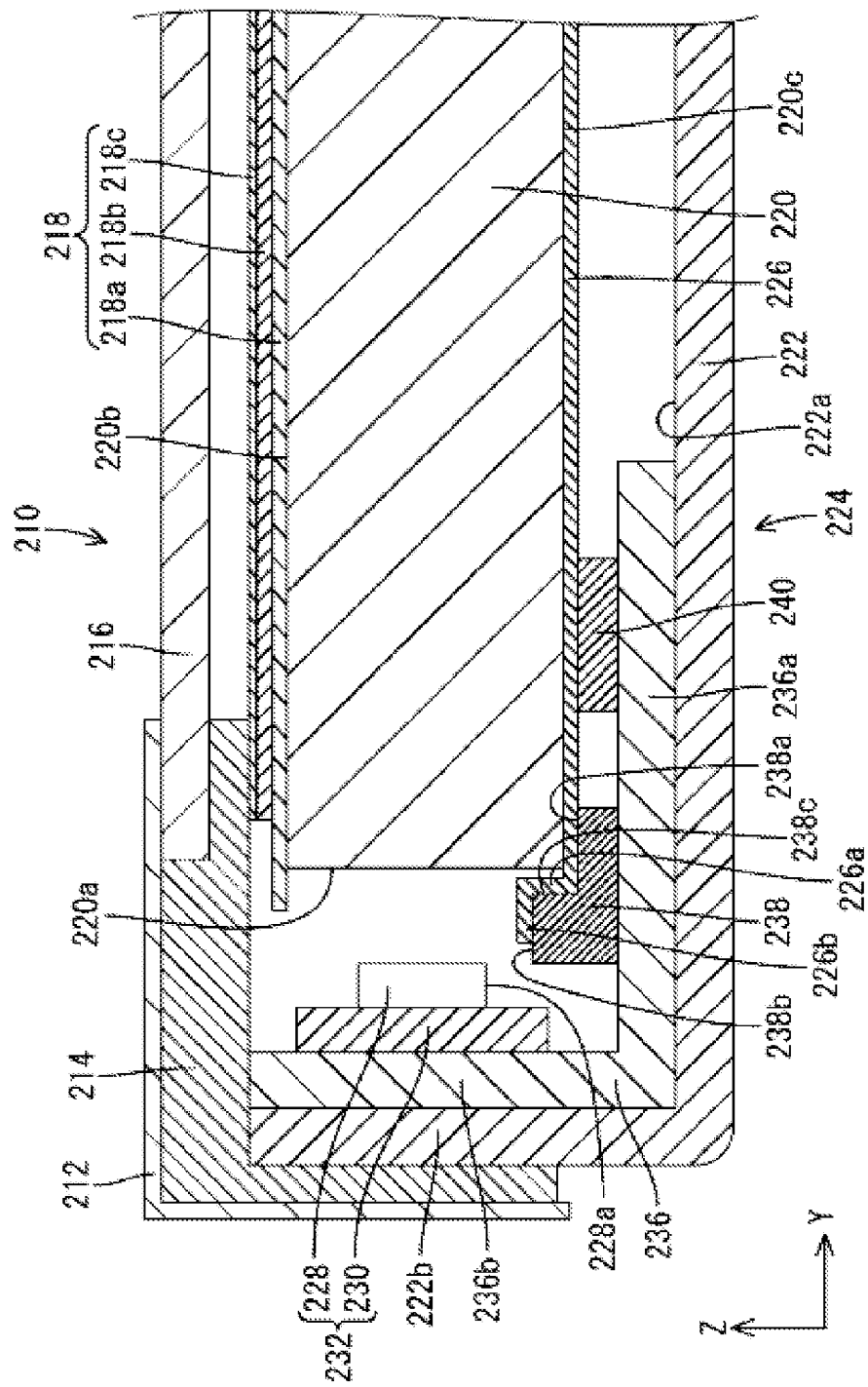
FIG. 6 is a cross-sectional view of a main part of a liquid crystal display device 210 according to Embodiment 3.

Embodiment 3 will be described with reference to the drawings. FIG. 6 shows a cross-sectional view of a main part of a liquid crystal display device 210 according to Embodiment 3. Embodiment 3 differs from Embodiment 1 in the configuration of an edge portion of a reflective sheet 226 adjacent to LED light sources 228. Other configurations are similar to those of Embodiment 1, and therefore, descriptions of the configurations, the operation, and the effect will be omitted. Parts in FIG. 6 that have 200 added to the reference characters of FIG. 4 are the same as these parts described in Embodiment 1.

As shown in FIG. 6, in the backlight device 224 of Embodiment 3, an edge portion of the reflective sheet 226 adjacent to the LED light sources 228 extends toward the LED light sources 228 further from the edge portion of Embodiment 2. That is, the reflective sheet 226 has a portion that further extends from an edge of the first folded portion 226a toward the LED light sources 228. The portion that extends from the edge of the first folded portion 226a is folded toward the LED light sources 228 along the second surface 238b, thereby forming a second folded portion 226b. With the reflective sheet 226 having such a configuration, light travelling from the LED light sources 228 toward the second surface 238b of the protruding member 238 is reflected by the second folded portion 238b and then enters the light-receiving face 220a. This configuration, together with the effect at the first surface 238a, can further improve the light incident efficiency of the light from the LED light sources 228 at the light receiving face 220a.

<Embodiment 4>

Figure 7:
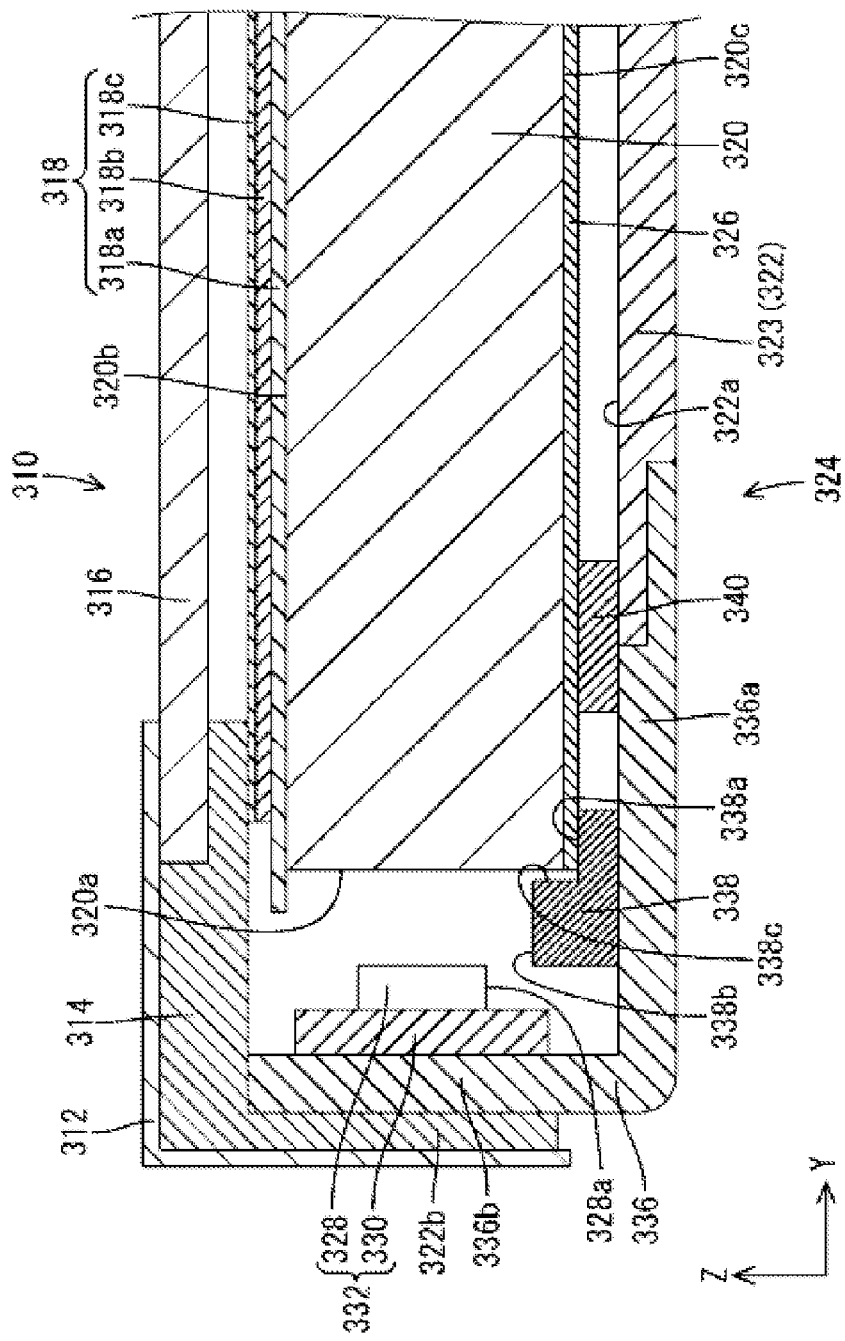
FIG. 7 is a cross-sectional view of a main part of a liquid crystal display device 310 according to Embodiment 4.

Embodiment 4 will be described with reference to the drawings. FIG. 7 shows a cross-sectional view of a main part of a liquid crystal display device 310 according to Embodiment 4. Embodiment 4 differs from Embodiment 1 in that a heat-dissipating member 336 constitutes a part of a chassis 322. Other configurations are similar to those of Embodiment 1, and therefore, descriptions of the configurations, the operation, and the effect will be omitted. Parts in FIG. 7 that have 300 added to the reference characters of FIG. 4 are the same as these parts described in Embodiment 1.

In a backlight device 324 of Embodiment 4, as shown in FIG. 7, the chassis 322 is constituted of the heat-dissipating member 336 and other members. That is, a part of the chassis 322 is the heat-dissipating member 336, and an LED substrate 330 makes contact with the side plate of the chassis 322. Each heat-dissipating member 336 is connected by a plate-shaped connecting member 323. The connecting member 323 is a part of a bottom plate 322a of the chassis 322. A protruding member 338 is integrally formed with the heat-dissipating member 336, which is a part of the chassis 322. With this configuration, the protruding member 338 and the chassis 322 can be manufactured at the same time in the manufacturing process of the backlight device 324, and therefore, the protruding member 338 can be formed with ease.

<Embodiment 5>

Figure 8:
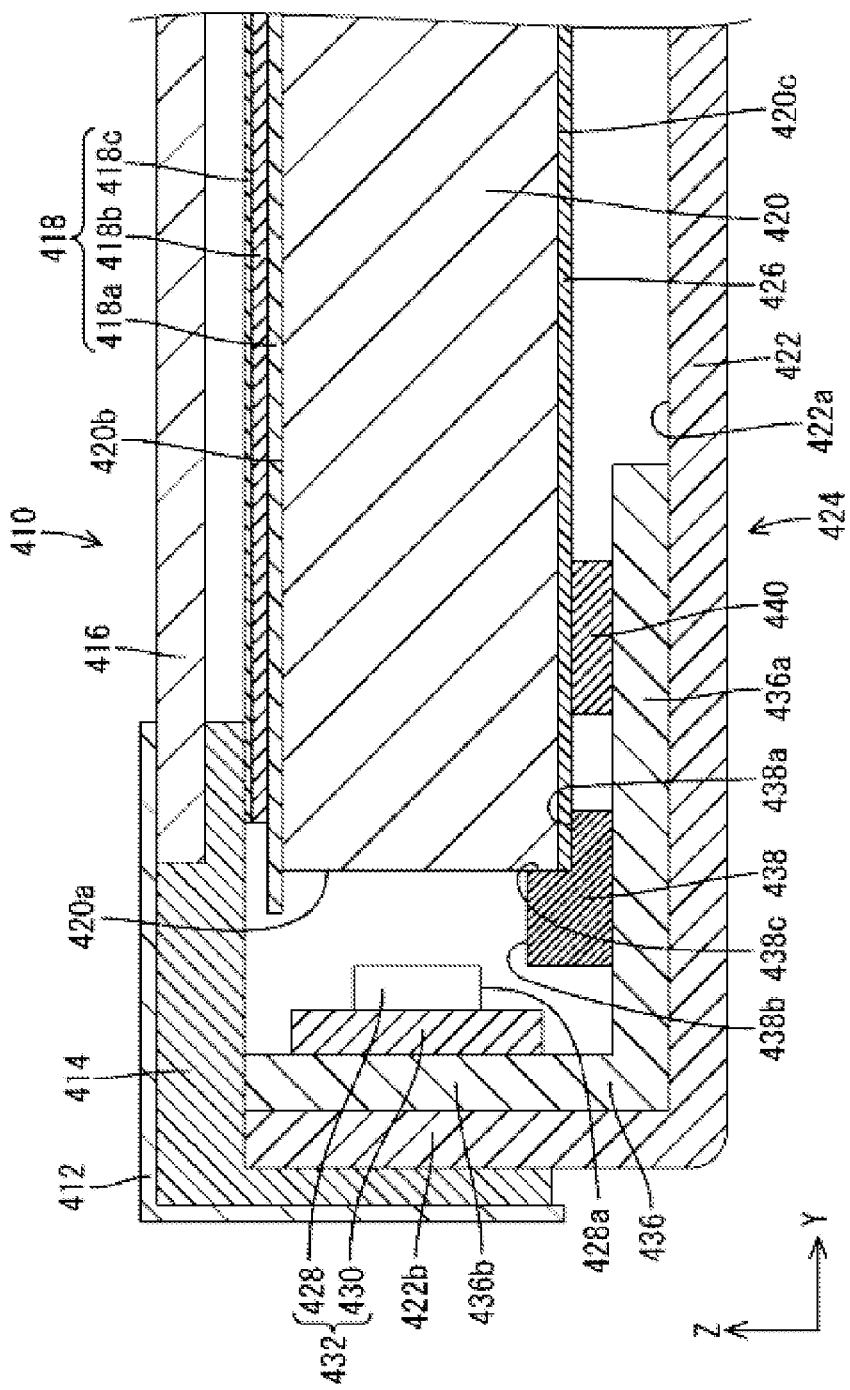
FIG. 8 is a cross-sectional view of a main part of a liquid crystal display device 410 according to Embodiment 5.

Embodiment 5 will be described with reference to the drawings. FIG. 8 shows a cross-sectional view of a main part of a liquid crystal display device 410 according to Embodiment 5. Embodiment 5 differs from Embodiment 1 in the arrangement of a protruding member 438. Other elements are similar to those of Embodiment 1, and therefore, descriptions of the configurations, the operation, and the effect will be omitted. Parts in FIG. 8 that have 400 added to the reference characters of FIG. 4 are the same as these parts described in Embodiment 1.

As shown in FIG. 8, in a backlight device 424 of Embodiment 5, a protruding member 438 is disposed such that a third surface 438c of the protruding member 438 makes contact with a light-receiving face 420a of a light guide plate 420 and an edge of a reflective sheet 426. With this configuration, the light-receiving face 420a of the light guide plate 420 can be prevented from moving toward LED light sources 428 due to thermal expansion or the like by the third surface 438b, and therefore, it is possible to maintain the distance between the LED light sources 428 and the light-receiving face 420a constant. Thus, excellent optical characteristics can be achieved in the backlight device 124.

The corresponding relation between the configurations of each embodiment and the configurations of the present invention will be described. The bottom sections 36a, 136a, 236a, and 436a (of the heat-dissipating member), and the bottom plate 322a (of the chassis) are examples of "plate member." The LED light sources 28, 128, 228, 328, and 428 are examples of "light sources." The backlight devices 24, 124, 224, 324, and 424 are examples of "illumination device." LED substrates 30, 130, 230, 330, and 430 are examples of "light source substrate." The liquid crystal display devices 10, 110, 210, 310, and 410 are examples of "display device."

Modification examples of the respective embodiments above will be described below.

(1) In the respective embodiments above, the configuration in which the reflective sheet is separated from the bottom plate of the chassis by the buffer member is shown as an example, but the buffer member may be omitted. The present invention is useful for a configuration in which the rear surface of an edge portion of the reflective sheet that faces LED light sources is not supported.

(2) In the respective embodiments above, the configuration in which the protruding member has two top surfaces (first surface and second surface) disposed at two different levels was shown as an example, but it is also possible to configure the protruding member so as to have three or more top surfaces respectively disposed at different levels.

(3) In addition to the respective embodiments above, the position, shape, and the like of the protruding member may be changed appropriately.

(4) In addition to the respective embodiments above, the shape and the like of the respective top surfaces of the protruding member may be changed appropriately.

(5) In the respective embodiments above, a liquid crystal display device using a liquid crystal panel as a display panel was illustratively shown, but the present invention is also applicable to a display device that uses another type of display panel.

(6) In the respective embodiments above, a television receiver that includes a tuner was illustratively shown, but the present invention is also applicable to a display device without a tuner.

Embodiments of the present invention were described above in detail, but these are merely examples, and do not limit the scope defined by the claims. The technical scope defined by the claims includes various modifications of the specific examples described above.

Also, the technical elements described in the present specification or shown in the drawings realize technical utility each on their own or through a combination of various technical elements, and are not limited to the combinations defined by the claims at the time of filing. Also, the techniques described in the present specification or shown in the drawings can accomplish a plurality of objects simultaneously, and each one of the objects on its own has technical utility.

DESCRIPTION OF REFERENCE CHARACTERS

TV television receiver
Ca, Cb cabinet
T tuner
S stand
10, 110, 210, 310, 410 liquid crystal display device
12, 112, 212, 312, 412 bezel
14, 114, 214, 314, 414 frame
16, 116, 216, 316, 416 liquid crystal panel 18, 118, 218, 318, 418 optical member
20, 120, 220, 320, 420 light guide plate
20a, 120a, 220a, 320a, 420a light-receiving face
22, 122, 222, 322, 422 chassis
24, 124, 224, 324, 424 backlight device
26, 126, 226, 326, 426 reflective sheet
28, 128, 228, 328, 428 LED light source
30, 130, 230, 330, 430 LED substrate
32, 132, 232, 332, 432 LED unit
36, 136, 236, 336, 436 heat-dissipating member
38, 138, 238, 338, 438 protruding member
38a, 138a, 238a, 338a, 438a first surface
38b, 138b, 238b, 338b, 438b second surface
40, 140, 240, 340, 440 buffer member

The invention claimed is:

1. An illumination device, comprising:
a plate member;
a light guide plate having a side face acting as a light-receiving face, the light guide plate being disposed such that a surface thereof faces a surface of the plate member;
a light source disposed above said surface of the plate member so as to face the light-receiving face;
a reflective sheet disposed on said surface of the light guide plate; and
a protruding member protruding from said surface of the plate member, the protruding member having a first surface and a second surface as two top surfaces, the first surface being disposed so as to contact a surface of the reflective sheet that faces the plate member, the second surface being disposed at a level higher than the first surface and said surface of the light guide plate and between the light-receiving face and the light source.

2. The illumination device according to claim 1,
wherein the reflective sheet has a first folded section in an edge portion that is adjacent to the light source, the first folded section being folded so as to extend along a face that connects the first surface and the second surface.

3. The illumination device according to claim 2,
wherein the reflective sheet has a second folded section that is folded toward the light source from an edge of the first folded section along the second surface.

4. The illumination device according to claim 1,
wherein a face that connects the first surface and the second surface is in contact with the light-receiving face.

5. The illumination device according to claim 1,
wherein the second surface of the protruding member is formed to be lower than an edge of the light source that faces the plate member in a cross-sectional view.

6. The illumination device according to claim 1,
wherein the protruding member is integrally formed with the plate member.

7. The illumination device according to claim 1, further comprising a buffer member interposed between the reflective sheet and the plate member,
wherein the buffer member is made of PORON.

8. The illumination device according to claim 1,
wherein the plate member has a wall portion that rises on a side of the plate member facing the light source,
wherein the illumination device further comprises a light source substrate having the light source provided on a surface thereof,
wherein the light source substrate is attached to the wall portion, and
wherein a heat-dissipating property of the plate member is higher than a heat-dissipating property of the light source substrate.

9. The illumination device according to claim 1, further comprising a chassis that houses the light guide plate, the light source, and the reflective sheet,
wherein the plate member is a part of the chassis.

10. The illumination device according to claim 1, further comprising:
a heat-dissipating member having the plate member as a part thereof and having a heat-dissipating property; and
a chassis that houses the light guide plate, the light source, the reflective sheet, and the heat-dissipating member.

11. A display device, comprising a display panel that displays images using light from the illumination device according to claim 1.

12. The display device according to claim 11, wherein the display panel is a liquid crystal panel that uses liquid crystal.

13. A television receiver, comprising the display device according to claim 11.

* * * * *